(12) United States Patent
Liu et al.

(10) Patent No.: US 9,225,232 B2
(45) Date of Patent: Dec. 29, 2015

(54) CAPACITOR DISCHARGE CIRCUIT AND POWER CONVERTER

(76) Inventors: Huan Liu, Shanghai (CN); Daofei Xu, Shanghai (CN)

( * ) Notice: Subject to any disclaimer, the term of this patent is extended or adjusted under 35 U.S.C. 154(b) by 445 days.

(21) Appl. No.: 13/549,831

(22) Filed: Jul. 16, 2012

(65) Prior Publication Data

US 2013/0076315 A1    Mar. 28, 2013

(30) Foreign Application Priority Data

Sep. 27, 2011    (CN) .......................... 2011 1 0289786

(51) Int. Cl.
*H02M 1/32*    (2007.01)

(52) U.S. Cl.
CPC .......... *H02M 1/32* (2013.01); *H02M 2001/322* (2013.01)

(58) Field of Classification Search
CPC ....................................................... H02M 1/32
USPC .......................................................... 320/166
See application file for complete search history.

(56) References Cited

U.S. PATENT DOCUMENTS

| 3,659,266 | A * | 4/1972 | Meyerle ......................... 340/430 |
| 7,939,963 | B2 * | 5/2011 | Chang et al. .................... 307/39 |
| 2011/0068751 | A1 * | 3/2011 | Lin et al. ........................ 320/166 |
| 2011/0122668 | A1 * | 5/2011 | Lo et al. ......................... 363/126 |
| 2012/0134185 | A1 * | 5/2012 | Shin et al. ....................... 363/44 |

FOREIGN PATENT DOCUMENTS

| CN | 101465548 A | 6/2009 |
| CN | 101714831 A | 5/2010 |
| CN | 102044981 A | 5/2011 |
| CN | 102075098 A | 5/2011 |
| TW | 201112603 A | 4/2011 |
| TW | 201114138 A1 | 4/2011 |
| TW | 201119172 A | 6/2011 |
| TW | 201126888 A1 | 8/2011 |

OTHER PUBLICATIONS

"First Office Action" issued by the State Intellectual Property Office of the People's Republic of China on Jun. 4, 2014.
Office Action issued on Jun. 2, 2015 by the TW Office.
Office Action issued on Jun. 4, 2014 by the CN Office.

* cited by examiner

*Primary Examiner* — Samuel Berhanu
*Assistant Examiner* — Harry O'Neill-Becerril
(74) *Attorney, Agent, or Firm* — Yunling Ren; Eaton & Van Winkle

(57) ABSTRACT

A capacitor discharge circuit and a power converter are provided. The capacitor discharge circuit includes a detection circuit and a discharge loop; the detection circuit has input ends electrically connected with input ends of an AC power supply, and an output end outputting a discharge detection signal to an input end of the discharge loop; the discharge loop is electrically connected with both ends of the capacitor that needs to be discharged and includes a switch unit and an energy consumption unit. When the AC power supply is disconnected, the discharge detection signal switches on the switch unit to conduct the discharge loop, such that the energy consumption unit discharges the capacitor that needs to be discharged. The power converter includes the capacitor discharge circuit.

19 Claims, 7 Drawing Sheets

CAPACITOR DISCHARGE CIRCUIT AND POWER CONVERTER

CROSS REFERENCE TO RELATED APPLICATIONS

The present disclosure claims priority under 35 U.S.C. §119 to Chinese Patent Application No. 201110289786.X, filed on Sep. 27, 2011, the entire content of which is incorporated herein by reference.

FIELD OF THE INVENTION

The present disclosure relates to the technical field of electronic circuits, in particular relates to a capacitor discharge circuit and a power converter.

BACKGROUND OF THE INVENTION

Generally, a filter such as electromagnetic interference (EMI) filter is provided in power converters for filtering and suppressing electromagnetic interference in the converters.

The filter is an electronic circuit apparatus for suppressing electromagnetic interference in a power circuit or a control signal circuit. The function of the filter is to keep noise generated within electronic equipment from leaking out, and at the same time to block noise generated in an AC circuit outside of the electronic equipment from entering into the equipment. Usually, the filter contains passive electronic components including capacitors and inductors, wherein the capacitors usually include X-capacitors, i.e., a safety capacitor for eliminating differential mode interference. The X-capacitor is typically positioned between input lines of an AC power supply, for example between Line L and Line N. During operation, the X-capacitor is charged and thus stored unsafe levels of high-voltage energy, therefore the X-capacitor should be discharged rapidly after the AC power supply is disconnected so as to avoid accidents.

FIG. 1 is an X-capacitor discharge circuit in the prior art. In the prior art, for security, an energy consumption resistor is provided as a discharge circuit and is connected in parallel with an X-capacitor Cx. As shown in FIG. 1, the energy consumption resistor includes two consumption resistors R1 and R2. After the AC power supply is disconnected, the energy consumption resistor and the X-capacitor Cx constitute a loop to discharge the stored energy to a safe level within a short time. The energy consumption resistor is referred to as a discharge resistor of the X-capacitor Cx.

However, when the power converter is in a normal operation state, namely, an AC power is supplied to the power converter, a power consumption of $Vac^2/(R1+R2)$ is contributed by the energy consumption resistor of the X-capacitor, wherein Vac (Voltage alternating current, AC voltage) denotes the AC voltage. For example, when Vac=230 v (volt) and R1+R2=2MΩ (megohm), $P=Vac^2/(R1+R2)=26.45$ mw (milliwatt), i.e., the energy consumption resistor produces about 26 mw power loss. The larger capacitance of the X-capacitor Cx is, the less of the required resistance values of the energy consumption resistors R1 and R2 are, and then the more of the power are consumed.

From above, the discharge circuit in the power converter in the prior art is always a contributor to the power consumption, especially when a larger capacitor is needed in consideration of suppressing electromagnetic interferences, a larger amount of power will be consumed by the discharge resistor. Meanwhile, with the development of technique, the requirement to the consumable energy in light load condition, which is negatively effected by the power consumption of the discharge resistor of the capacitor, is more and more rigorous.

SUMMARY OF THE INVENTION

One object of the present disclosure is to provide a capacitor discharge circuit and a power converter which can, in part, solve the problem that too much power is consumed by the discharge resistor of the capacitor of the prior art.

In one aspect, the present disclosure provides a capacitor discharge circuit, both ends of a capacitor that needs to be discharged are respectively electrically connected with two input ends of an AC power supply, and the capacitor discharge circuit is electrically connected with both ends of the capacitor that needs to be discharged, wherein the capacitor discharge circuit includes a detection circuit and a discharge loop; the detection circuit has input ends electrically connected with the input ends of the AC power supply, and an output end outputting a discharge detection signal to an input end of the discharge loop; the discharge loop is electrically connected with both ends of the capacitor that needs to be discharged, the discharge loop includes a switch unit and an energy consumption unit, and ON or OFF of the switch unit is controlled by the discharge detection signal output from the output end of the detection circuit; and when the AC power is disconnected, the discharge detection signal output from the detection circuit switches on the switch unit in the discharge loop to conduct the discharge loop, such that the energy consumption unit discharges the capacitor that needs to be discharged.

The detection circuit can include a first switch, a first rectifier, a second capacitor and a first DC power supply. In some embodiments, the first switch is a transistor; and the first switch has a base electrically connected with one end of the second capacitor; an emitter connected to the ground; and a collector electrically connected with the first DC power supply.

In some embodiments, the first rectifier includes a first diode and a second diode; the first diode and the second diode are disposed in the same direction, anodes of the two diodes are respectively electrically connected with the two input ends of the AC power supply, and cathodes of the two diodes are electrically connected, after being short connected with each other, with the other end of the second capacitor.

The detection circuit can further include a first resistor and a second resistor. One end of the first resistor is electrically connected with the first DC power supply, and the other end of the first resistor is electrically connected with the collector of the first switch, and the collector of the first switch is the output end of the detection circuit; and one end of the second resistor is electrically connected with the first rectifier, and the other end of the second resistor is electrically connected with one end of the second capacitor.

The detection circuit can further include a third diode; the third diode has a cathode electrically connected with the base of the first switch, and an anode connected to the ground.

The detection circuit can further include a first capacitor; one end of the first capacitor is electrically connected with the collector of the first switch, and the other end of the first capacitor is connected to the ground.

The detection circuit can further include a stabilivolt, the stabilivolt has a cathode electrically connected with the collector of the first switch, and an anode connected to the ground.

In some other embodiments, the switch unit of the discharge loop is a second switch; and the energy consumption unit at least includes a control chip; the control chip has a first pin VCC, a second pin HV and a third pin FB provided thereon; and the second switch is an electric field effect transistor; the second switch has a gate electrically connected with the output end of the detection circuit, a drain electrically connected with the first pin VCC of the control chip, and a source connected to the ground.

The discharge loop can further include a second rectifier; the second rectifier includes a fifth diode and a sixth diode; cathodes of the fifth diode and the sixth diode are electrically connected, after being short connected with each other, with the second pin HV of the control chip; an anode of the fifth diode and an anode of the sixth diode are respectively electrically connected with the both ends of the capacitor that needs to be discharged.

The fifth diode and sixth diode in the second rectifier can be the first diode and the second diode in the first rectifier of the detection circuit.

The discharge loop can further include a seventh diode and an eighth diode; anodes of the seventh diode and the eighth diode are connected, after being short connected with each other, to the ground, cathode of the seventh diode and cathode of the eighth diode are respectively electrically connected with both ends of the capacitor that needs to be discharged.

The seventh diode and the eighth diode can be two diodes in the rectifier bridge of the power converter.

The discharge loop can further include a third resistor and a fourth resistor; the fourth resistor is connected in series between the control chip and the second rectifier; the third resistor is connected in series between the control chip and the second switch; and one end of the fourth resistor is electrically connected with the second pin HV of the control chip; and the third resistor is electrically connected with the first pin VCC of the control chip.

The discharge loop can further include a third capacitor and a fourth diode; one end of the third capacitor is electrically connected with the first pin VCC of control chip, and the other end of the third capacitor is connected to the ground; and the fourth diode has a cathode electrically connected with the drain of the second switch, and an anode electrically connected with the third pin FB of the control chip.

In further some embodiments, the switch unit of the discharge loop is a third switch, the energy consumption unit is a fifth resistor; the third switch is an electric field effect transistor; the third switch has a gate electrically connected with the output end of the detection circuit, a drain electrically connected with one end of the fifth resistor, and a source connected to the ground.

The discharge loop can further include a second rectifier; the second rectifier includes a fifth diode and a sixth diode; cathodes of the fifth diode and the sixth diode are electrically connected, after being short connected with each other, with the other end of the fifth resistor; an anode of the fifth diode and an anode of the sixth diode are respectively electrically connected with both ends of the capacitor that needs to be discharged.

The fifth diode and sixth diode in the second rectifier can be the first diode and the second diode in the first rectifier of the detection circuit.

The discharge loop can further include a seventh diode and an eighth diode; anodes of the seventh diode and the eighth diode are connected, after being short connected with each other, to the ground, cathode of the seventh diode and cathode of the eighth diode are respectively electrically connected with both ends of the capacitor that needs to be discharged.

The seventh diode and the eighth diode can be two diodes of the rectifier bridge of the power converter.

In still some embodiments, the switch unit of the discharge loop is a fourth switch, the energy consumption unit is a sixth resistor, and the discharge loop further includes a signal transform circuit; the fourth switch is a bi-directional thyristor, the fourth switch has a gate electrically connected with the output end of the signal transform circuit; the input end of the signal transform circuit is electrically connected with the output end of the detection circuit; and one end of the sixth resistor is electrically connected with a master electrode of the fourth switch; the other end of the sixth resistor and the other master electrode of the fourth switch are respectively electrically connected with both ends of the capacitor that needs to be discharged.

A seventh resistor is connected in series between the gate of the fourth switch and the output end of the signal transform circuit; one end of the seventh resistor is electrically connected with the fourth switch, and the other end of the seventh resistor is electrically connected with the output end of the signal transform circuit.

The capacitor that needs to be discharged can be an X-capacitor.

In another aspect, the present disclosure also provides a power converter, which includes the capacitor discharge circuit described as above.

The beneficial effects of the present disclosure include that, but are not limited to: the capacitor discharge circuit and the power converter of the present disclosure check whether the AC power supply is disconnected by the detection circuit in the capacitor discharge circuit, and when the AC power supply is disconnected, the discharge loop is conducted and the capacitor is discharged. The discharge loop is conducted only when the AC power supply is disconnected. When the power converter operates normally, the discharge loop is in the non-conductive state, thereby no power is consumed, and the power consumption of the power converter can be reduced.

BRIEF DESCRIPTION OF THE DRAWING

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE EMBODIMENTS

In order to make the object, technical solution and advantages of the present disclosure more clear, capacitor discharge circuits and power converters of the present disclosure will be further described in detail in conjunction with accompanying drawings and embodiments. It should be understood that the embodiments described herein are only intended for illustrating, but not for limiting the present disclosure.

In embodiments and the claims, the words "a", "an", "one", "the" and "said" may generally refer to singular or plural unless a specific definition of the article is given in the description.

The words "about" or "approximate" used herein are used to modify any quantity capable of changing slightly, while this slight change does not alter its essence. Unless specified in the embodiments in particular, the error range of the values modified by the words "about" or "approximate" is usually within 20 percent, preferably within 10 percent, and more preferably within 5 percent.

First Embodiment

Figure 1:
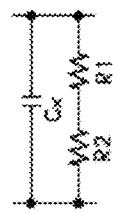
FIG. 1 is a view illustrating a capacitor discharge circuit in the prior art.
Figure 2:
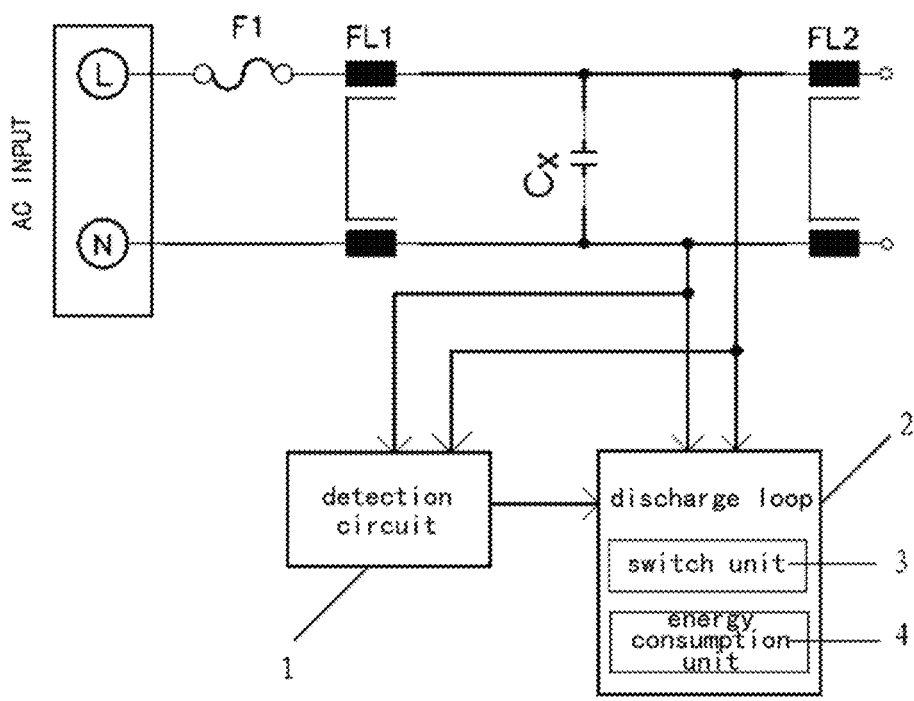
FIG. 2 is a block diagram showing the structure of an X-capacitor discharge circuit according to a first embodiment of the present disclosure.

According to the first embodiment of the present disclosure, a capacitor discharge circuit is disclosed, wherein both ends of a capacitor that needs to be discharged are electrically connected with both input ends of an AC power supply, respectively, and the capacitor discharge circuit is electrically connected with the both ends of the capacitor that needs to be discharged. As shown in FIG. 2, the capacitor discharge circuit includes a detection circuit 1 and a discharge loop 2.

Input ends of the detection circuit 1 are electrically connected with the input ends of the AC power supply, and an output end thereof is electrically connected with an input end of the discharge loop 2. The detection circuit 1 outputs a discharge detection signal. The discharge loop 2 is electrically connected with both ends of the capacitor that needs to be discharged, and it includes a switch unit 3 and an energy consumption unit 4. ON or OFF of the switch unit 3 is controlled by the discharge detection signal output from the output end of the detection circuit 1.

When the AC power supply is disconnected, the discharge detection signal output from the detection circuit 1 switches on the switch unit 3 in the discharge loop 2 to conduct the discharge loop 2, such that the energy consumption unit 4 discharges the capacitor.

When the AC power supply is connected, the discharge detection signal output from the detection circuit 1 cannot switch on the switch unit 3 in the discharge loop 2, that is, the discharge loop 2 is open when the AC power supply is connected. Therefore, when the AC power supply is connected, the capacitor is not discharged and the discharge loop 2 does not consume energy. Since the discharge circuit only consumes energy when the AC power supply is disconnected, the power consumption can be reduced.

As one implementable manner, the discharge detection signal output from the output end of the detection circuit 1 is a potential signal. When the AC power supply is disconnected, the output end of the detection circuit 1 outputs a high potential signal, which can switch on the switch unit 3 of the discharge loop 2 and then the discharge loop 2 is conducted, thereby the discharge loop 2 can discharge the capacitor through the energy consumption unit 4. The potential value of the high potential signal is greater than or equals to a conduction threshold potential value of the switch unit. When the AC power supply is connected, the detection circuit 1 outputs a low potential signal, which signal does not reach the potential threshold value (i.e., the conduction threshold potential value) at which the switch unit 3 can be switched on, that is, the discharge loop 2 is in an open state when the AC power supply is connected.

It should be explained that under the technical inspiration of the present disclosure, those skilled in the art may make slight modification to the circuit, such as when the AC power supply is disconnected, the output end of the detection circuit 1 outputs a low potential signal; and when the AC power supply is connected, the output end of the detection circuit 1 outputs a high potential signal, and similarly, when the AC power supply is disconnected, the switch unit 3 of the discharge loop 2 is switched on and the discharge loop 2 is conducted, and thus the capacitor is discharged through the discharge loop 2. It is apparent that the technical solution provided by the present disclosure includes various technical means of controlling ON and OFF of the discharge loop 2 using the potential signal output from the detection circuit 1, which are not limited to the embodiments described herein.

Taking X-capacitor Cx as an example, i.e., the capacitor that needs to be discharged is the X-capacitor Cx, the capacitor discharge circuit of the present disclosure will be described as below.

Figure 3:
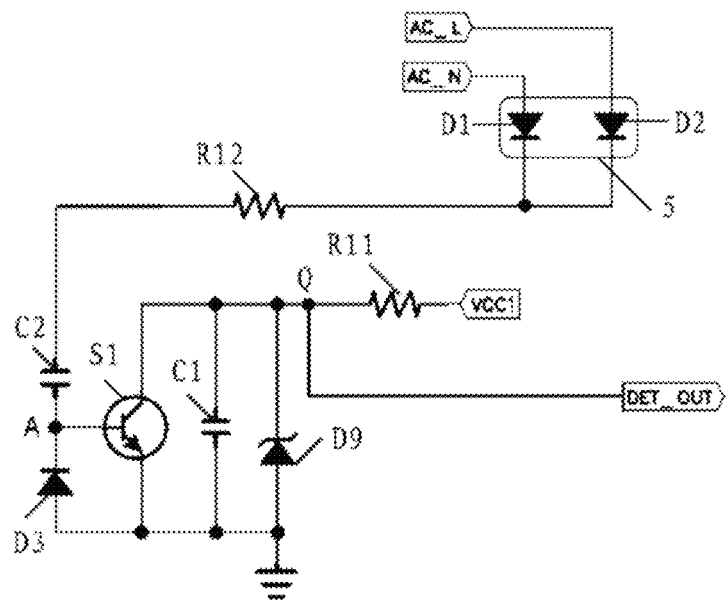
FIG. 3 is a view illustrating the detection circuit that may be used in the circuit of FIG. 2.

As shown in FIG. 3, as one implementable manner, the detection circuit 1 includes a first switch S1, a first rectifier 5, a second capacitor C2 and a first DC power supply VCC1.

The first switch S1 is a semiconductor electronic switch, ON or OFF of which is controlled by a potential signal from its control end. As one implementable manner, the first switch S1 is a transistor (triode). The first switch S1 has a collector electrically connected with the first DC power supply VCC1, an emitter connected to the ground, and a base electrically connected with one end of the second capacitor C2. Point A shown in FIG. 3 is a connection point between the base of the first switch S1 and the second capacitor C2.

As one implementable manner, the first rectifier 5 includes a first diode D1 and a second diode D2 respectively connected to both ends of the AC power supply and disposed in the same direction. Anodes of both diodes (D1, D2) are electrically connected to both ends (line L and line N) of the AC power supply respectively, and cathodes of both diodes (D1, D2) are short connected with each other, and then electrically connected with the other end of the second capacitor C2. Due to the forward conduction property of the diode, when an AC power is applied, the positive half cycle of the AC power (i.e. line L is positive and line N is negative) is able to pass through the diode D2, and the negative half cycle of the AC power (i.e. line L is negative and line N is positive) is able to pass through the diode D1. In this way, the waveform of AC power is changed from a sine waveform into a steamed bun waveform by the first rectifier 5.

Usually, as one implementable manner, the first DC power supply VCC1 is supplied by a power converter (not shown in the drawings) or a control circuit (not shown in the drawings) of the power converter.

As one implementable manner, the detection circuit 1 also includes a first resistor R11 and a second resistor R12. One end of the first resistor R11 is electrically connected with the first DC power supply VCC1, and the other end of the first resistor R11 is electrically connected with the collector (i.e., a point Q, which is the output end of the detection circuit) of the first switch S1. One end of the second resistor R12 is electrically connected with the cathode ends of the first diode D1 and the second diode D2, and the other end of the second resistor R12 is electrically connected with the other end of the capacitor C2.

As one implementable manner, the detection circuit 1 also includes a third diode D3. The third diode D3 has a cathode electrically connected with the base of the first switch transistor S1 and an anode connected to the ground.

Further, the detection circuit 1 also includes a stabilivolt D9 and a first capacitor C1. One end of the first capacitor C1 is electrically connected with the collector of the first switch S1, and the other end is connected to the ground. The stabilivolt D9 has an anode connected to the ground and a cathode electrically connected with the collector of the first switch S1.

As one implementable manner, when the AC power is connected, the steamed bun waveform output from the first rectifier 5 transfers to the base of the first switch S1 after passing through the second resistor R12 and the second capacitor C2, such that the first switch S1 periodically operates between ON and OFF states. When the first switch S1 is switched off, the first DC power supply VCC1 charges the first capacitor C1 through the first resistor R11; and when the first switch S1 is switched on, the energy on the first capacitor C1 is discharged to zero through the first switch S1. The first resistor R11 and the first capacitor C1 constitute a charge delay circuit. When the first switch S1 is switched off, the first DC power supply VCC1 charges the first capacitor C1 through the charge delay circuit constituted by the first resistor R11 and the first capacitor C1. The first resistor R11 and the first capacitor C1 are properly selected (for example, R11 and C1 have a time constant of about 20 ms) such that in the case that the AC power is connected, when the first switch S1 is switched off, the potential value formed on the first capacitor C1 is smaller than the conduction threshold potential value of the switch unit 3 of the discharge loop 2; and when the first switch S1 is switched on, the energy on the first capacitor C1 is discharged to zero through the first switch S1. Therefore, throughout the input of the AC power, the potential signal output from the output end (point Q) of the detection circuit 1 is not high enough to conduct the discharge loop 2, that is, the discharge loop 2 does not consume energy when the AC power is connected.

When the AC power supply is disconnected, point A is of low potential, the first switch S1 in the detection circuit 1 is cut off by the low potential of the base, and the first DC power supply VCC1 continually charges the first capacitor C1 through the first resistor R11. At this time, the AC power supply is disconnected, thereby the first switch S1 is no more switched on, and the first capacitor C1 is continually charged, that is, the potential of the point Q is continually uprising. When the potential signal output from the point Q reaches to the threshold potential value for switching on the switch unit 3, the switch unit 3 is switched on, the discharge loop 2 and the capacitor Cx that needs to be discharged constitute a closed loop, and the energy stored in the capacitor Cx that needs to be discharged is consumed by the energy consumption unit 4.

When the first switch S1 in the detection circuit 1 is switched off, the first DC power supply VCC1 charges the first capacitor C1 through the charge delay circuit constituted by the first resistor R11 and the first capacitor C1. When the potential value on the first capacitor C1 reaches to the conduction threshold potential value of the switch unit 3 after a certain period of time, the discharge loop 2 is conducted, and the capacitor Cx that needs to be discharged discharges the energy, which means only when the AC power supply input is cut off and/or the first switch S1 is switched off for a certain period of time, the capacitor Cx that needs to be discharged is discharged, so as to avoid the discharge loop from being mistakenly conducted when the AC power is connected.

When the potential value on the first capacitor C1 is charged to the reverse breakdown voltage of the stabilivolt D9 connected in parallel with the first capacitor C1, the stabilivolt D9 is broken down reversely, at this time the voltage on the first capacitor C1 is kept on the reverse breakdown voltage of the stabilivolt D9 due to the property of the stabilivolt.

The discharge loop 2 of the present disclosure will be described in detail as below.

Figure 4:
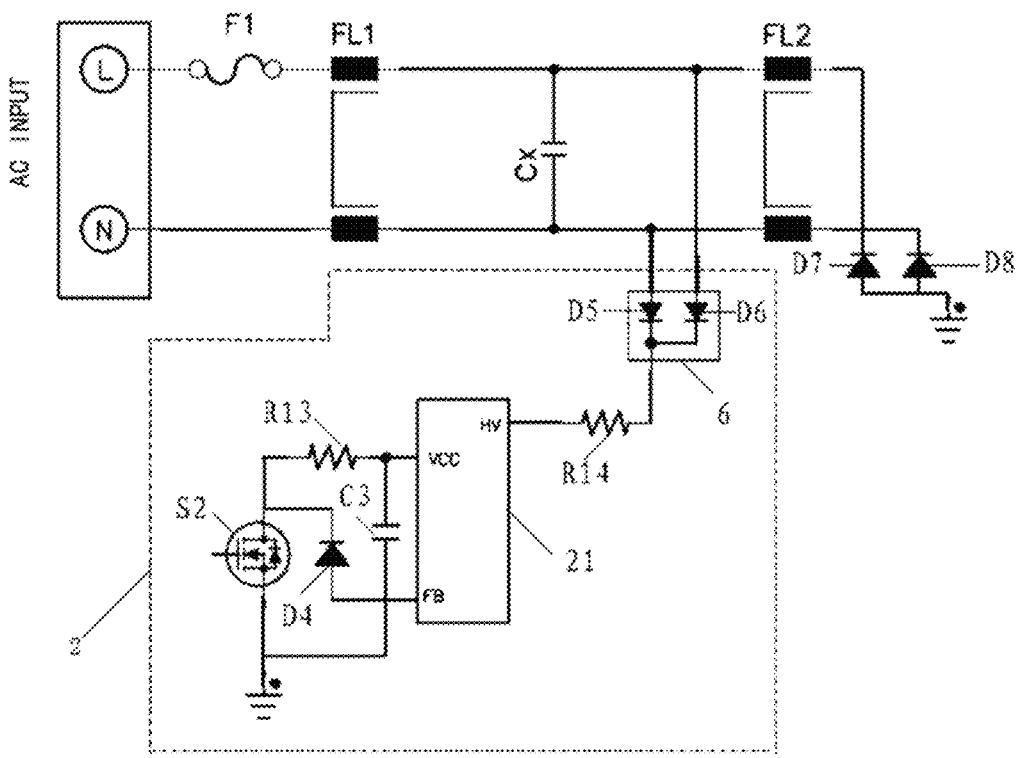
FIG. 4 is a view illustrating an implementable manner of a discharge loop according to the first embodiment of the present disclosure.

As shown in FIG. 4, as one implementable manner, the switch unit 3 of the discharge loop 2 is a second switch S2, and the energy consumption unit 4 is a control chip 21 together with its peripheral devices.

As one implementable manner, the control chip has a first pin VCC which is a power supply pin of the control chip, a second pin HV which is a high voltage start-up end of the control chip, and a third pin FB which is an output voltage feedback pin of the control chip. The control chip 21 may be any chips having three pins described above, for example, a control chip model NCP1337, TEA1751T and the like. The control chip 21 is available in the prior art, therefore, the description of which is omitted in the embodiments of the present disclosure.

The discharge loop 2 also includes a second rectifier 6, a seventh diode D7 and an eighth diode D8.

The second switch S2 is a semiconductor electronic switch, ON or OFF of which is controlled by the potential signal of its control end. As one implementable manner, the second switch S2 is a power field effect transistor. The second switch S2 has a gate electrically connected with the output end (Q end) of the detection circuit 1, a drain electrically connected with the first pin VCC of the control chip 21 through a third resistor R13, and a source connected to the ground.

As one implementable manner, the second switch S2 is a low voltage power field effect transistor.

As one implementable manner, the second rectifier 6 includes a fifth diode D5 and a sixth diode D6. An anode of the fifth diode D5 and an anode of the sixth diode D6 are respectively connected with both ends of the X-capacitor Cx that needs to be discharged, and cathodes of the fifth diode D5 and the sixth diode D6 are electrically connected, after being short connected with each other, with the second pin HV of the control chip through a fourth resistor R14.

Anodes of both the seventh diode D7 and the eighth diode D8 are connected to the ground, and a cathode of the seventh diode D7 and a cathode of the eighth diode D8 are respectively electrically connected with both ends of the AC power supply (i.e. both ends of the X-capacitor Cx that needs to be discharged).

Figure 5:
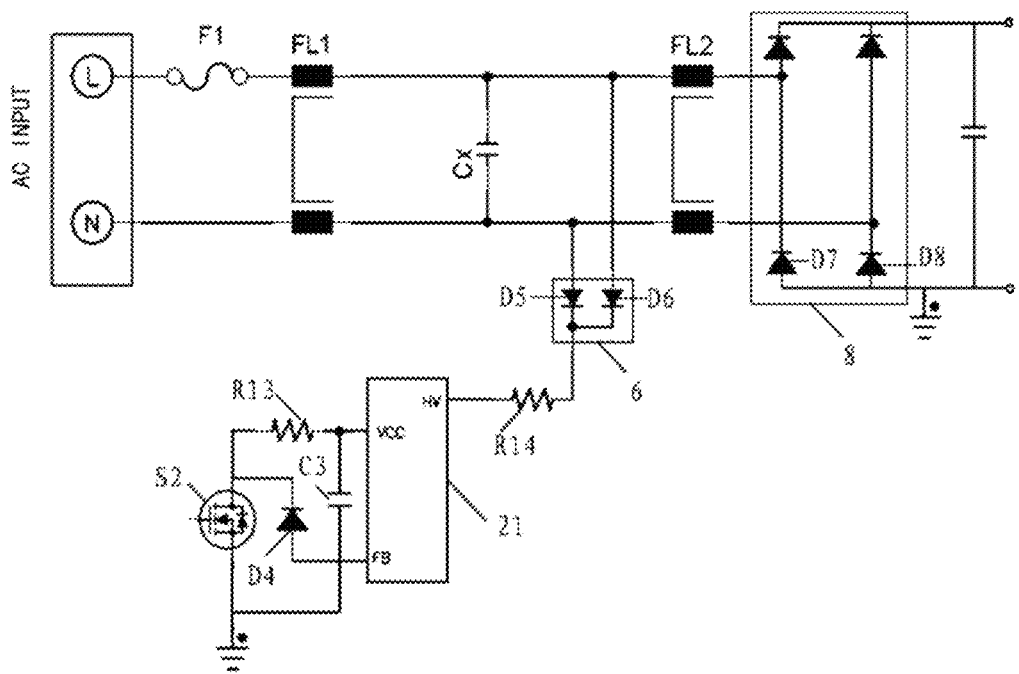
FIG. 5 is a view illustrating another implementable manner of a discharge loop according to the first embodiment of the present disclosure.

Similarly, two diodes in a rectifier bridge 8 of the power converter may be used as the seventh diode D7 and the eighth diode D8, as shown in FIG. 5.

Figure 6:
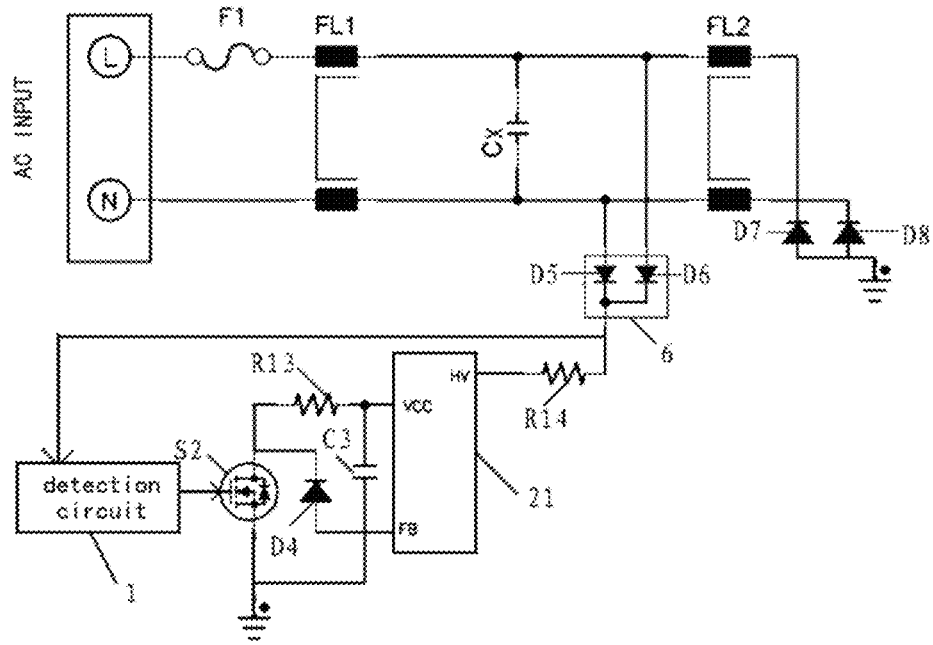
FIG. 6 is a view illustrating an implementable manner of an X-capacitor discharge circuit implemented with the discharge loop shown in FIG. 4.

As shown in FIG. 6, after the AC power supply is disconnected, the discharge detection signal output from the detection circuit 1 switches on the second switch S2 in the discharge loop 2, at this time, the first pin VCC of the control chip 21 is discharged rapidly through the third resistor R13 and the second switch S2. When the first pin VCC of the control chip 21 is discharged to a certain value, the second pin HV of the control chip 21 is activated, and the energy of the X-capacitor Cx charges the first pin VCC of the control chip 21 through the second rectifier 6 and the second pin HV of the control chip 21. In this way, the energy stored in the X-capacitor Cx can be discharged through the control chip 21 and its periphery devices after the AC power supply is disconnected.

As one implementable manner, the discharge loop 2 also includes a third capacitor C3 and a fourth diode D4. The third capacitor C3 has one end electrically connected with the first pin VCC of the control chip 21 and one end of the third resistor R13, and the other end connected to the ground. The fourth diode D4 has a cathode electrically connected with the drain of the second switch S2, and an anode electrically connected with the third pin FB of the control chip 21. After the AC power supply is disconnected and the discharge detection signal output from the detection circuit 1 switches on the second switch S2 in the discharge loop 2, the high potential of the third pin FB of the control chip 21 is discharged to a low potential through the fourth diode D4 and the second switch S2 which has been switched on to prevent the power converter from supplying power to the first pin VCC of the control chip 21, such that the discharge loop 2 can operate normally as shown in FIG. 6.

The discharge loop 2 may be described as below: when the voltage of the X-capacitor Cx is positive on top side and negative on the bottom, i.e., the voltage at one end connected to the line L as shown in the drawings is positive and the voltage at the other end connected to the line N is negative, the energy on the X-capacitor Cx passes through the sixth diode D6, the control chip 21 and its periphery devices, the second switch S2, the ground and the eighth diode D8, and then comes back to the negative end of the X-capacitor Cx so as to constitute a discharge loop. When the voltage of the X-capacitor Cx is negative on top side and positive on the bottom, i.e., the voltage at one end connected to the line L as shown in the drawings is negative and the voltage at the other end connected to the line N is positive, the energy on the X-capacitor Cx passes through the fifth diode D5, the control chip 21 and its periphery devices, the second switch S2, the ground and the seventh diode D7, and then comes back to the negative end of the X-capacitor Cx so as to constitute a discharge loop.

As one implementable manner, the second rectifier 6 in the discharge loop 2 and the first rectifier 5 in the detection circuit 1 are the same rectifier, but it is not limited thereto.

Figure 7:
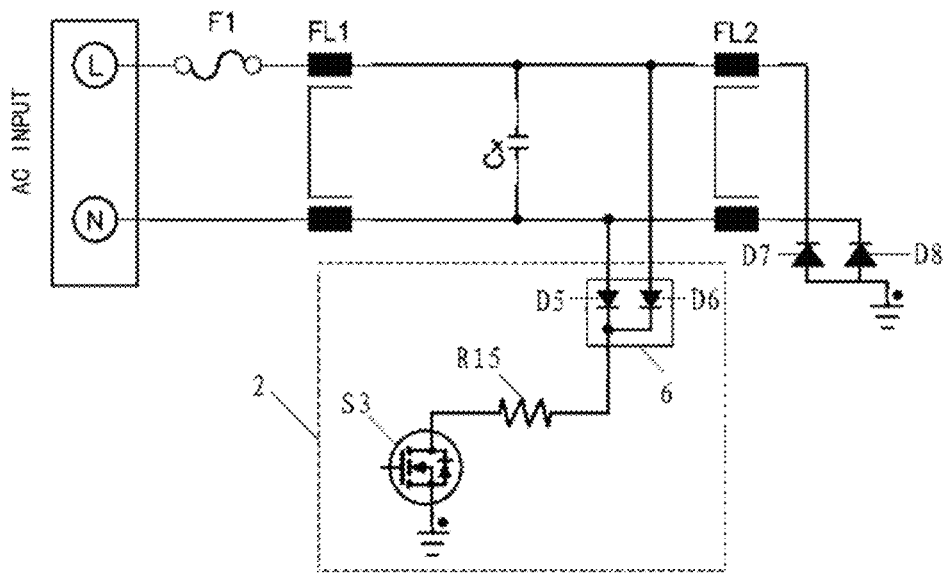
FIG. 7 is a view illustrating another implementable manner of a discharge loop according to the first embodiment of the present disclosure.

Referring to FIG. 7, as another embodiment, the switch unit 3 of the discharge loop 2 is a third switch S3 and the energy consumption unit 4 is a fifth resistor R15. In this embodiment, the discharge loop 2 also includes a second rectifier 6, a seventh diode D7 and an eighth diode D8.

The third switch S3 is a semiconductor electronic switch, ON or OFF of which is controlled by the potential signal on its control end. As one implementable manner, the third switch S3 is a power field effect transistor including a gate electrically connected with the output end (Q end) of the detection circuit 1, a drain electrically connected with one end of the fifth resistor R15, and a source connected to the ground.

As one implementable manner, the third switch S3 is a high voltage power field effect transistor.

As one implementable manner, the second rectifier 6 includes a fifth diode D5 and a sixth diode D6. The cathodes of the fifth diode D5 and the sixth diode D6 are electrically connected, after being short connected with each other, with the other end of the fifth resistor R15, and the anode of the fifth diode D5 and the anode of the sixth diode D6 are respectively electrically connected with both ends of the X-capacitor Cx that needs to be discharged.

The anodes of the seventh diode D7 and the eighth diode D8 are connected to the ground, and the cathode of the seventh diode D7 and the cathode of the eighth diode D8 are respectively electrically connected with both ends of the AC power supply (i.e. both ends of the X-capacitor Cx that needs to be discharged).

Figure 8:
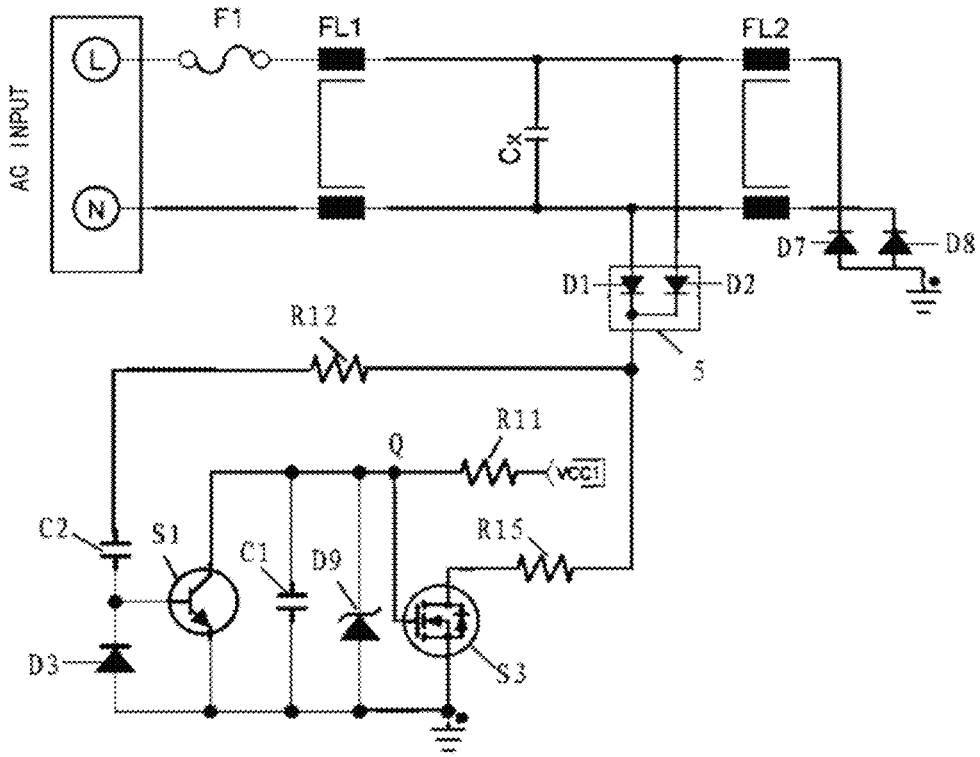
FIG. 8 is a view illustrating another implementable manner of an X-capacitor discharge circuit implemented with the discharge loop shown in FIG. 7.

Referring to FIG. 8, which is a view illustrating an X-capacitor discharge circuit in another embodiment. The output point Q of the detection circuit 1 is connected with the gate of the third switch S3 of the discharge loop 2.

In this embodiment, the detection circuit 1 and the discharge loop 2 share the same rectifier, which means the first rectifier 5 and the second rectifier 6 are the same rectifier. The second rectifier (first rectifier) includes two diodes (D1, D2). The cathodes of those two diodes (D1, D2) are respectively connected, after being short connected with each other, with the second resistor R12 and the fifth resistor R15.

That is, as one implementable manner, the second rectifier (D5, D6) and the first rectifier (D1, D2) may be the same type of device. In the application, the detection circuit 1 and the discharge loop 2 may share the same rectifier, which means the first rectifier 5 and the second rectifier 6 may use the same rectifier, but it is not limited thereto.

In the present embodiment, after the AC power supply is disconnected, the discharge detection signal output from the output end point Q of the detection circuit 1 switches on the third switch S3 of the discharge loop 2, thereby the discharge loop 2 is conducted, and the X-capacitor Cx starts to discharge. When the voltage of the X-capacitor Cx is positive on top side and negative on the bottom, i.e., the voltage at one end connected to the line L as shown in the drawings is positive and the voltage at the other end connected to the line N is negative, the energy on the X-capacitor Cx passes through the second diode D2, the fifth resistor R15, the third switch S3, the ground and the eighth diode D8, and then comes back to the negative end of the X-capacitor Cx so as to constitute a discharge loop. When the voltage of the X-capacitor Cx is negative on top side and positive on the bottom, i.e., the voltage at one end connected to the line L as shown in the drawings is negative and the voltage at the other end connected to the line N is positive, the energy on the X-capacitor Cx passes through the first diode D1, the fifth resistor R15, the third switch S3, the ground and the seventh diode D7, and then comes back to the negative end of the X-capacitor Cx so as to constitute a discharge loop. Therefore, in the case that the AC power supply is disconnected, when the third switch S3 is switched on, the discharge loop 2 consumes the energy stored in the X-capacitor Cx rapidly. After the AC power supply is applied, the discharge detection signal output from the output end point Q of the detection circuit 1 does not conduct the discharge loop 2 and thus there is no energy consumption. That is, the discharge loop only consumes energy after the AC power supply is disconnected, thereby the power consumption is reduced.

Figure 9:
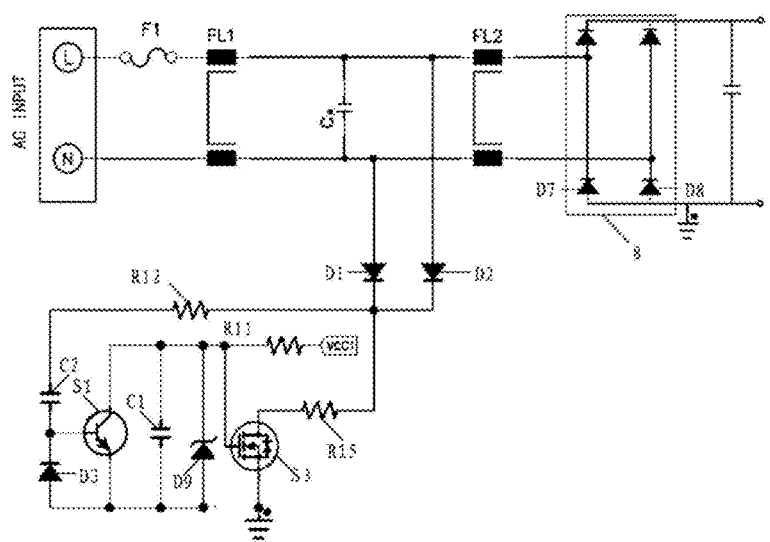
FIG. 9 is a view illustrating another preferred implementable manner of an X-capacitor discharge circuit implemented with the discharge loop shown in FIG. 7.

As one implementable manner, the seventh diode D7 and the eighth diode D8 may be two diodes in the rectifier bridge 8 of the power converter, as shown in FIG. 9.

Figure 10:
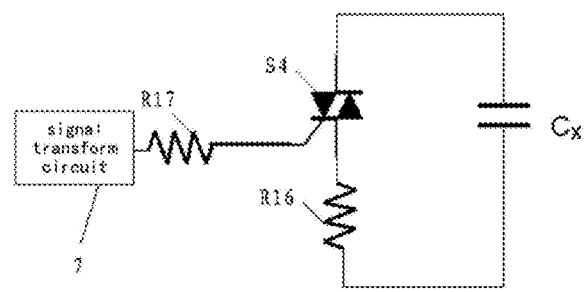
FIG. 10 is a view illustrating another implementable manner of a discharge loop according to the first embodiment of the present disclosure.
Figure 11:
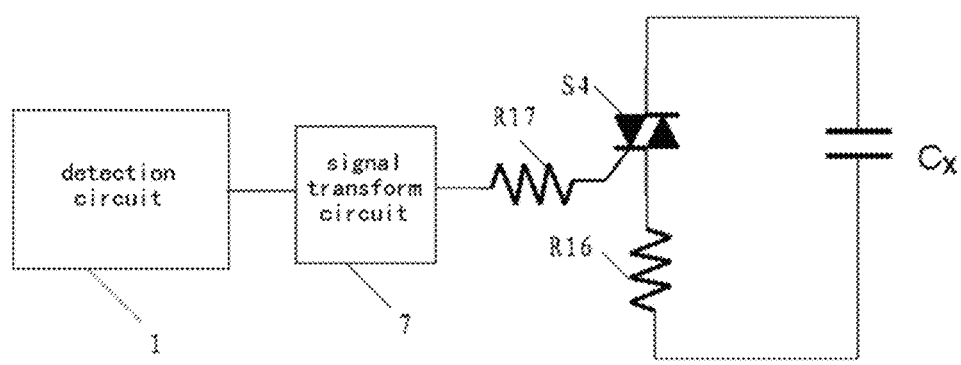
FIG. 11 is a view illustrating another implementable manner of an X-capacitor discharge circuit implemented with the discharge loop in shown FIG. 10.

Referring to FIG. 10 and FIG. 11, as one implementable manner, the switch unit 3 of the discharge loop 2 is a fourth switch S4, the energy consumption unit 4 is a sixth resistor R16, and the fourth switch S4 is a bi-directional thyristor (bi-directional silicon controlled rectifier (BCR) or triad AC semiconductor switch (TRIAC)).

FIG. 10 is a view illustrating a discharge loop in another embodiment. In the present embodiment, the discharge loop 2 also includes a signal transform circuit 7. The output end point Q of the detection circuit 1 is connected with a gate of the bi-directional thyristor (the fourth switch S4) through the signal transform circuit 7 and a resistor R17. One main electrode of the bi-directional thyristor (the fourth switch S4) is electrically connected with one end of the sixth resistor R16, and the other end of the sixth resistor R16 and the other main electrode of the bi-directional thyristor (the fourth switch S4) are electrically connected with both ends of the capacitor that needs to be discharged, respectively.

After the AC power supply is disconnected, the discharge detection signal output from the output end point Q of the detection circuit 1 makes the bi-directional thyristor (the fourth switch S4) to be capable of bidirectional conducted after passing through the signal transform circuit 7, thereby the fourth switch S4, the sixth resistor R16 and the capacitor needs to be discharged (X-capacitor Cx) constitute a discharge loop. Due to the bidirectional conduction property of the bi-directional thyristor, no matter which end (the end connected to the line L or the end connected to the line N) of the X-capacitor Cx is of positive potential, that is, no matter the AC power supply is disconnected during positive half cycle or during negative half cycle, the energy stored on the capacitor can be rapidly consumed by the sixth resistor R16 through the fourth switch S4, so as to ensure safety. When the AC power is connected, the discharge detection signal output from the output end point Q of the detection circuit 1, after passing through the signal transform circuit 7, causes the bi-directional thyristor (the fourth switch S4) to be cut off, thereby the discharge loop is not conducted and does not consume energy. That is, the discharge loop only consumes energy after the AC power supply is disconnected, thereby the power consumption is reduced.

The results of the experiments indicate that, in the case that an output power of a model power converter is 90 w, the X-capacitor Cx is 0.62 uF, the AC power supply has a virtual value of 265V, the frequency is 50 HZ, and both discharge resistors in the prior art are 560 kΩ, the total loss of the power converter in the prior art using the discharge resistors is 171 mw at standby condition, while the total loss of the power converter in the present disclosure embodiment, when implemented with the circuit shown in FIG. 6, is 121 mw at the same condition, thereby total loss is reduced.

Figure 12:
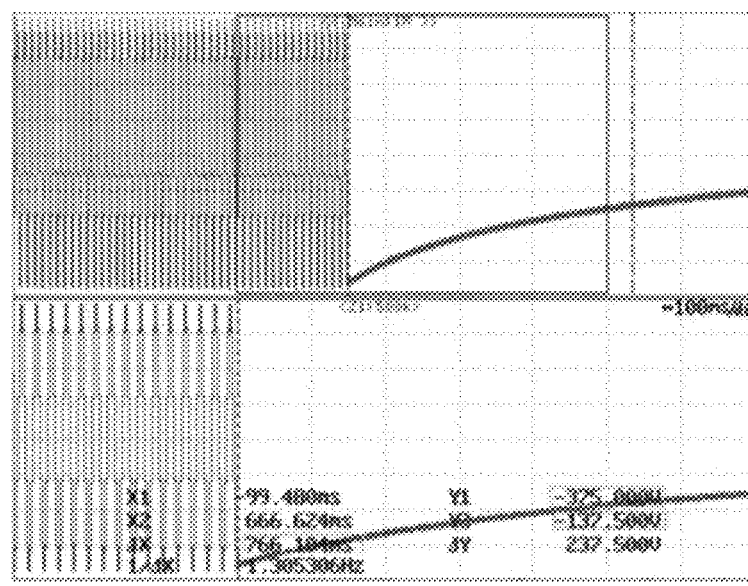
FIG. 12 is a diagram illustrating a discharge waveform of the capacitor discharge circuit in the prior art.
Figure 13:
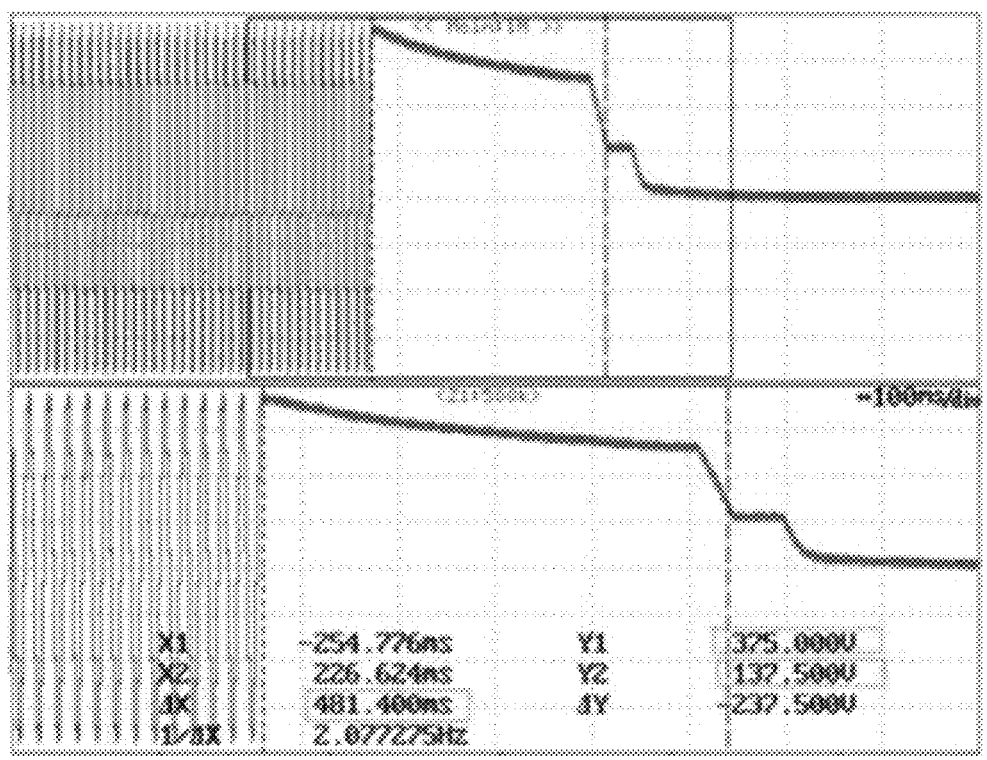
FIG. 13 is a diagram illustrating the discharge waveform of the capacitor discharge circuit according to the first embodiment of the present disclosure.

Referring to FIG. 12 and FIG. 13, FIG. 12 is a diagram illustrating the discharge waveform of the capacitor discharge circuit in the prior art, and FIG. 13 is a diagram illustrating the discharge waveform of the capacitor discharge circuit in the embodiment of the present disclosure shown in FIG. 6.

When the test AC power supply is 265V/50 HZ, the capacitor discharge circuit provided in the embodiment of the present disclosure needs a time of 481.400 ms to reduce the voltage of both ends of the X-capacitor Cx from 375V to 137.5V; but in the same test condition, the discharge circuit in the prior art needs a time of 766.104 ms to reduce the voltage of both ends of the X-capacitor Cx from −375V to −137.5V. Obviously, the present disclosure can shorten the discharge time, thereby the high voltage carried by the X-capacitor Cx that may be harmful can be discharged as soon as possible to lower the dangerous index.

According to the capacitor discharge circuit provided in the embodiment of the present disclosure, when in the normal operation state, the discharge loop 2 does not work, and when the AC power supply is disconnected, the discharge loop 2 is activated by the detection circuit 1 to discharge the capacitor in a short time, which could protect people's safety, and meanwhile the power consumption caused by discharging the capacitor that needs to be discharged can be reduced.

Second Embodiment

The present disclosure also provides a power converter. This power converter is electrically connected with the AC power supply and includes a capacitor discharge circuit.

The capacitor discharge circuit in the power converter according to the embodiment of the present disclosure is electrically connected with both ends of the capacitor that needs to be discharged, and the capacitor discharge circuit includes a detection circuit 1 and a discharge loop 2.

Input ends of the detection circuit 1 are electrically connected with input ends of the AC power supply, and an output end of the detection circuit outputs a discharge detection signal to an input end of the discharge loop 2. The discharge loop 2 includes a switch unit 3 and an energy consumption unit 4, wherein ON or OFF of the switch unit 3 is controlled by the discharge detection signal output from the output end of the detection circuit 1.

When the AC power supply is disconnected, the discharge detection signal output from the detection circuit 1 switches on the switch unit 3 in the discharge loop, such that the discharge loop 2 is conducted and the energy consumption unit 4 discharges the capacitor that needs to be discharged.

In the embodiments of the present disclosure, as one implementable manner, when the AC power supply is disconnected, the discharge detection signal (potential signal) output from the output end of the detection circuit 1 is of high potential, which switches on the switch unit 3 in the discharge loop 2, such that the energy stored in the capacitor can be rapidly discharged through the switch unit 3 and the energy consumption unit 4 in the discharge loop 2. When the power converter operates normally (i.e., the AC power is connected), the detection circuit 1 outputs a discharge detection signal of low potential to switch off the switch unit 3 in the discharge loop 2, which means when the AC power is connected, the discharge loop 2 does not consume power.

The capacitor discharge circuit in the converter in the embodiments of the present disclosure may be implemented in the same way as that of the capacitor discharge circuit in the first embodiment, therefore, the detailed description thereof are not given in the second embodiment.

According to the capacitor discharge circuit and the power converter of the present disclosure, by utilizing the cooperation between the detection circuit 1 and the discharge loop 2 and various properties of the electronic switch devices, the discharge loop 2 does not work when the AC power is connected, and the detection circuit 1 activates the discharge loop 2 to discharge the capacitor in a short time after the AC power supply is disconnected, so as to protect people for safety and efficiently reduce the power consumption.

It should be understood that, the capacitor discharge circuit and the method thereof disclosed in the present disclosure may be applied in AC-AC and AC-DC power converter or other kinds of power converters. The capacitor that needs to be discharged is not limited to the X-capacitor, any other kinds of capacitors that needs to be discharged may use the capacitor discharge system of the present disclosure. Moreover, a plurality of capacitors connected in parallel may be discharged simultaneously.

Finally, it should be understood, it is apparent that those skilled in the art may conceive any modifications and variations to the present disclosure without departing from the spirit and the scope of the present disclosure. In this way, if the modifications and the variations of the present disclosure belong to the scope of the claims and their equivalents of the present disclosure, they are intended to be enclosed by the present disclosure.

| Reference sign list: | |
|---|---|
| Cx~X-capacitor; | R1~first energy consumption resistor; |
| R2~second energy consumption resistor; | |
| 1~detection circuit; | 2~discharge loop; |
| 3~switch unit; | 4~energy consumption unit; |
| S1~first switch; | 5~first rectifier; |
| C2~second capacitor; | VCC1~first DC power supply; |
| D1~first diode; | D2~second diode; |
| R11~first resistor; | R12~second resistor; |
| D3~third diode; | D9~stabilivolt; |
| C1~first capacitor; | S2~second switch; |
| 21~ control chip; | VCC~first pin; |
| HV~second pin; | FB~third pin; |
| R13~third resistor; | R14~fourth resistor; |
| C3~third capacitor; | D4~fourth diode; |
| 6~second rectifier; | D5~fifth diode; |
| D6~sixth diode; | D7~seventh diode; |
| D8~eighth diode; | 8~rectifier bridge; |
| S3~third switch; | R15~fifth resistor; |
| S4~fourth switch; | 7~signal transform circuit; |
| R16~sixth resistor; | R17~seventh resistor. |

What is claimed is:

1. A capacitor discharge circuit, two ends of a first capacitor that needs to be discharged being electrically connected with two input ends of an AC power supply respectively, and the capacitor discharge circuit being electrically connected with both ends of the first capacitor that needs to be discharged, wherein the capacitor discharge circuit includes a detection circuit and a discharge loop;
wherein:
the detection circuit has input ends electrically connected with the input ends of the AC power supply, and an output end outputting a discharge detection signal to an input end of the discharge loop;
the discharge loop is electrically connected with both ends of the first capacitor that needs to be discharged, wherein the discharge loop includes a switch unit and an energy consumption unit, and ON or OFF of the switch unit is controlled by the discharge detection signal output from the output end of the detection circuit; and
when the AC power supply is disconnected, the discharge detection signal output from the detection circuit switches on the switch unit in the discharge loop to conduct the discharge loop, such that the energy consumption unit discharges the first capacitor that needs to be discharged,
wherein the switch unit of the discharge loop is a second switch; and the energy consumption unit at least includes a control chip;
the control chip is provided with a first pin VCC, a second pin HV and a third pin FB; and
the second switch is an electric field effect transistor; the second switch has a gate electrically connected with the output end of the detection circuit, a drain electrically connected with the first pin VCC of the control chip, and a source connected to the ground; and
wherein the discharge loop further includes a second rectifier;
the second rectifier includes a fifth diode and a sixth diode; cathodes of the fifth diode and the sixth diode are electrically connected, after being short connected with each other, with the second pin HV of the control chip; an anode of the fifth diode and an anode of the sixth diode are respectively electrically connected with the both ends of the first capacitor that needs to be discharged.

2. The capacitor discharge circuit according to claim 1, wherein the detection circuit comprises a first switch, a first rectifier, a second capacitor and a first DC power supply;
wherein the first switch is a transistor; and the first switch comprises a base electrically connected with one end of the second capacitor, an emitter connected to the ground, and a collector electrically connected with the first DC power supply.

3. The capacitor discharge circuit according to claim 2, wherein the first rectifier includes a first diode and a second diode;
the first diode and the second diode are disposed in the same direction, anodes of the two diodes are respectively electrically connected with the two input ends of the AC power supply, and cathodes of the two diodes are electrically connected, after being short connected with each other, with the other end of the second capacitor.

4. The capacitor discharge circuit according to claim 2, wherein the detection circuit further comprises a first resistor and a second resistor;
one end of the first resistor is electrically connected with the first DC power supply, and the other end of the first resistor is electrically connected with the collector of the first switch, and the collector of the first switch is the output end of the detection circuit; and
one end of the second resistor is electrically connected with the first rectifier, and the other end of the second resistor is electrically connected with one end of the second capacitor.

5. The capacitor discharge circuit according to claim 2, wherein the detection circuit further includes a third diode;
the third diode has a cathode electrically connected with the base of the first switch, and an anode connected to the ground.

6. The capacitor discharge circuit according to claim 2, wherein the detection circuit further includes a third capacitor;
one end of the third capacitor is electrically connected with the collector of the first switch, and the other end of the third capacitor is connected to the ground.

7. The capacitor discharge circuit according to claim 2, wherein the detection circuit further includes a stabilivolt, the stabilivolt has a cathode electrically connected with the collector of the first switch, and an anode connected to the ground.

8. The capacitor discharge circuit according to claim 1, wherein the fifth diode and the sixth diode in the second rectifier are a first diode and a second diode in a first rectifier of the detection circuit.

9. The capacitor discharge circuit according to claim 1, wherein the discharge loop further includes a seventh diode and an eighth diode;
anodes of the seventh diode and the eighth diode are connected, after being short connected with each other, to the ground, cathode of the seventh diode and cathode of the eighth diode are respectively electrically connected with the both ends of the first capacitor that needs to be discharged.

10. The capacitor discharge circuit according to claim 9, wherein the seventh diode and the eighth diode are two diodes in a rectifier bridge of a power converter.

11. The capacitor discharge circuit according to claim 1, wherein the discharge loop further includes a third resistor and a fourth resistor;
- the fourth resistor is connected in series between the control chip and the second rectifier; the third resistor is connected in series between the control chip and the second switch; and
- one end of the fourth resistor is electrically connected with the second pin HV of the control chip; and the third resistor is electrically connected with the first pin VCC of the control chip.

12. The capacitor discharge circuit according to claim 1, wherein the discharge loop further includes a third capacitor and a fourth diode;
- one end of the third capacitor is electrically connected with the first pin VCC of the control chip, and the other end of the third capacitor is connected to the ground; and
- the fourth diode has a cathode electrically connected with the drain of the second switch, and an anode electrically connected with the third pin FB of the control chip.

13. The capacitor discharge circuit according to claim 1, wherein the switch unit of the discharge loop is a third switch, the energy consumption unit is a fifth resistor;
- the third switch is an electric field effect transistor; the third switch has a gate electrically connected with the output end of the detection circuit, a drain electrically connected with one end of the fifth resistor, and a source connected to the ground.

14. The capacitor discharge circuit according to claim 13, wherein the discharge loop further includes a second rectifier; the second rectifier includes a fifth diode and a sixth diode;
- cathodes of the fifth diode and the sixth diode are electrically connected, after being short connected with each other, with the other end of the fifth resistor; an anode of the fifth diode and an anode of the sixth diode are respectively electrically connected with the both ends of the capacitor that needs to be discharged.

15. The capacitor discharge circuit according to claim 14, wherein the fifth diode and the sixth diode in the second rectifier are a first diode and a second diode in a first rectifier of the detection circuit.

16. The capacitor discharge circuit according to claim 13, wherein the discharge loop further includes a seventh diode and an eighth diode;
- anodes of the seventh diode and the eighth diode are connected, after being short connected with each other, to the ground, cathode of the seventh diode and cathode of the eighth diode are respectively electrically connected with the both ends of the capacitor that needs to be discharged.

17. The capacitor discharge circuit according to claim 16, wherein the seventh diode and the eighth diode are two diodes of a rectifier bridge of a power converter.

18. The capacitor discharge circuit according to claim 1, wherein the first capacitor that needs to be discharged is an X-capacitor.

19. A power converter including the capacitor discharge circuit according to claim 1.

* * * * *